UNITED STATES PATENT OFFICE.

WILLIAM M. DAWSON, OF NEW YORK, N. Y.

PLASTERING-RETARDER AND METHOD OF MAKING SAME.

SPECIFICATION forming part of Letters Patent No. 523,658, dated July 31, 1894.

Application filed February 15, 1894. Serial No. 500,298. (No specimens.)

*To all whom it may concern:*

Be it known that I, WILLIAM M. DAWSON, a citizen of the United States, residing in the city, county, and State of New York, have invented a new and useful Restraining Compound for Plasters, Cements, &c., and a Process of Making the Same; and I do hereby declare that the following is a full, clear, and exact description of the same.

My invention relates to a new compound for incorporation in cement, plaster, or mortar and like quick-setting plastics, to operate as a restrainer and to secure the toughening and strengthening action which renders the product made from such cement strong and durable.

The invention also relates to the process of producing this new compound.

The object of the invention is to provide a restraining and hardening compound for use as a finishing coat or for incorporation as an ingredient of plasters, of a high degree of efficiency at such cost as permit it to be used instead of other less efficient restraining compounds now commonly used.

The present invention is an improvement upon that described in my patent, No. 511,879, dated January 2, 1894, with the purpose of providing a compound of a character to take the place and serve the functions of what is known as "Keen's cement,"—a very high-priced material, and in many respects my present process is like that described in my prior patent above referred to.

I take, for example, a quantity of animal or vegetable organic matter and permit it to soak for several days in a proper quantity of water at a temperature of from 80° to 200° Fahrenheit. When fermentation or decomposition has progressed so that the albuminous and nitrogenous substances have been liberated from the organic matter and the liquid has turned to a dark watery color, it is incorporated with a mild lime, or lime partially air-slacked. The incorporation of the lime and liquid has the effect of freeing the ammonia from the liquor. The lime which drives off or frees the ammonia serves as a vehicle for the liquor and forms the body to be mixed with the cement or plaster. The mass thus obtained is allowed to dry, and to this composition I add two parts of nitrate of sodium either before or after drying the mass, or in lieu of this, one part of nitrate of sodium and one part of borax. After the ingredients have been properly incorporated, the mass is thoroughly ground to a powder for convenient manipulation.

This composition may be used in the various ways set forth in my previous patent. If added to plaster it will exert the same hardening and toughening effect so necessary for producing a material which will make a hard and very compact and durable finishing cement, also for making a wall much harder than is now produced by the ordinary patented wall plasters. If intended to be mixed with plaster, any other substances may be used together with this compound, such as sand, marble dust or vegetable or animal fiber, according to the exigencies of any particular occasion.

The quantity of this composition to be used will depend upon the degree of hardening that is desired to be accomplished. If added to plaster when covering walls, it may be used with or without the admixture of any other material, and even in such case if it be used in the proportion of only twelve ounces to the one hundred pounds of plaster, a considerable hardening and restraining effect will be had.

By varying the proportion of this composition the nature of the material can be regulated and controlled accurately to the requirements of the artisan.

Having now described my invention, what I claim is—

1. The process of making a compound to harden and otherwise improve plaster of paris, cement and the like, which consists in fermenting and decomposing organic matter in water, mixing the resulting liquid and lime, then adding two parts of nitrate of sodium, more or less, and then drying and reducing the mass to a fine powder, as specified.

2. The herein described compound which results from the mixture of lime, nitrate of sodium, and a liquor obtained by the decomposition of organic matter in water, as described.

In testimony whereof I affix my signature in the presence of two witnesses.

WILLIAM M. DAWSON.

Witnesses:
GEORGE TECKEMEYER,
CHAS. J. DALY.